United States Patent [19]
Baremor

[11] 3,886,813
[45] June 3, 1975

[54] DIFFERENTIAL
[75] Inventor: Jerry F. Baremor, Marshall, Mich.
[73] Assignee: Eaton Corp., Cleveland, Ohio
[22] Filed: Apr. 10, 1974
[21] Appl. No.: 459,631

[52] U.S. Cl. .............................. 74/710.5; 74/711
[51] Int. Cl. ............................................. F16h 1/44
[58] Field of Search .................. 74/710.5, 711, 713; 192/35

[56] References Cited
UNITED STATES PATENTS

| | | | |
|---|---|---|---|
| 3,051,020 | 8/1962 | Hartupee | 74/710.5 |
| 3,546,968 | 12/1970 | Altmann | 74/710.5 |
| 3,811,341 | 5/1974 | Goscenski, Jr. | 74/711 |

*Primary Examiner*—Samuel Scott
*Assistant Examiner*—P. S. Lall
*Attorney, Agent, or Firm*—Teagno & Toddy

[57] ABSTRACT

A differential structure includes a differential case defining a differential gear chamber. The differential gearing is located in the gear chamber and includes a pair of side gears and pinion gears meshing with the side gears and which pinion gears are rotatable with the case. The side gears are output gears and a pair of output drives are connected with the respective side gears for driving respective loads. A lockup clutch mechanism is associated with one of the side gears for retarding rotation of the side gear relative to the case in response to a predetermined degree of relative rotation therebetween. The differential is constructed to deactivate the lockup clutch upon a predetermined torque being applied to the differential due to windup of the output drives.

6 Claims, 4 Drawing Figures

DIFFERENTIAL

BACKGROUND OF THE INVENTION

The present invention relates to a locking-type differential gear mechanism, and in particular relates to a locking-type differential gear mechanism which has provision for enabling release of the lockup mechanism when a predetermined torque is experienced by the differential gearing due to windup of the output drives from the differential gearing.

Locking differential mechanisms are well known. Such differentials are known to be used as interaxle differentials such as in a four-wheel drive, as well as interwheel differentials interposed between wheels on a common axle. Locking-type differential mechanisms which are known in the art normally include a mechanism for locking two rotatable parts of the differential together, which, of course, thereby retards the differential action of the differential. A specific locking mechanism may take, and has in the art taken many different forms and generally is a clutch mechanism such as a disc pack, cone clutch, etc. Known locking-type differential mechanisms also include an actuator or engagement mechanism for actuating the locking mechanism (clutch) to effect the lockup of the two differential parts.

Ottemann U.S. Pat. No. 3,606,803 discloses a known locking-type differential in which the side gear of the differential is locked through a suitable clutch mechanism to the case of the differential upon a predetermined degree of differential action occurring. When the differentiating action reaches a predetermined degree, an actuator mechanism is operated which actuates the clutch mechanism to effect the lockup, and the clutch mechanism locks the side gear of the differential to the differential casing.

In U.S. Pat. No. 3,606,803, the clutch mechanism is actuated upon relative rotation of the side gear and a cam member. The cam member is retarded from rotation with the side gear upon operation of an actuating mechanism for the differential. The actuating mechanism comprises a series of weights which are thrown out upon a predetermined amount of differential action occurring and, when thrown out, are latched from rotating and accordingly effect a rotation retarding action on the cam member which in turn results in the side gear rotating relative to the cam member. When this relative rotation occurs, the cam member moves axially and actuates the clutch mechanism for locking the side gear to the case of the differential. Similar differential mechanisms disclosing different types of actuator mechanisms are shown in copending applications Ser. No. 304,617, now U.S. Pats. No. 3,811,341, and Ser. No. 320,440, now U.S. Pat. No. 3,818,781, filed in the name of Goscenski and assigned to the assignee of the present invention. In such lockup differential mechanisms, release of the lockup mechanism is achieved when a so-called torque reversal is applied to the differential.

Frequently, in the known lock-up differentials, even though the differential mechanism is locked up, there may be forces acting on the output drives which tend to apply different torque loads on the differential mechanism. For example, when a four-wheel drive vehicle having an interaxle lock-up differential is driven on a hard surface road, the output drives from the differential to the front and rear wheels, respectively, may tend to wind up due to differences in front to rear wheel speed caused by tire size, differential load conditions, etc. Of course, when the differential mechanism is locked up (incapable of differentiating) these forces are applied to the differential and tend to force differential action to occur, which action, due to lockup, can not occur. Such forces may have a damaging effect on the drive line components or differential and could even cause breakage of certain of the parts, if excessive.

SUMMARY OF THE PRESENT INVENTION

The present invention is directed to a solution of the problem of windup of the drive line due to differences in front to rear wheel speeds caused by tire size, differential load conditions, etc. In accordance with the present invention, a lockup differential gear mechanism is constructed so that after locking of the differential, any forces which normally tend to windup the drive line are experienced by the differential gear mechanism. However, the lockup differential of the present invention is constructed so as to release the lockup when the torque level experienced by the differential mechanism reaches a predetermined magnitude.

In the disclosed embodiment of the present invention, lockup of the differential occurs by retarding rotation of a cam member relative to a side gear, and the cam member is shifted axially due to the relative rotation between the cam member and the side gear in order to lock up the lockup clutch mechanism, much as described in the afore-mentioned patent and applications. However, in accordance with the present invention, when the torque load on the differential gearing, due to windup of the drive line, reaches a predetermined level, the cam may shift further axially away from the side gear and eventually reaches a point where the amount of relative rotation between the cam and the side gear is sufficient to enable the cam to return to its initial position thereby effecting an unlocking of the lockup clutch mechanism to enable differential action to again occur. Accordingly, in accordance with the present invention, damaging torque levels in the drive line due to drive line windup are avoided, and in fact, a predetermined torque applied to the differential, due to such drive line windup, effects a disengagement of the lockup mechanism. Of course, the self deenergization of the lockup mechanism does not affect the availability of torque to drive the vehicle out of any situation where the normal lockup mechanism is intended to be operable.

DESCRIPTION OF THE DRAWINGS

Further advantages and features of the present invention will be apparent to those skilled in the art to which it relates from the following detailed description of a preferred embodiment thereof made with reference to the accompanying drawings in which.

Figure 1:
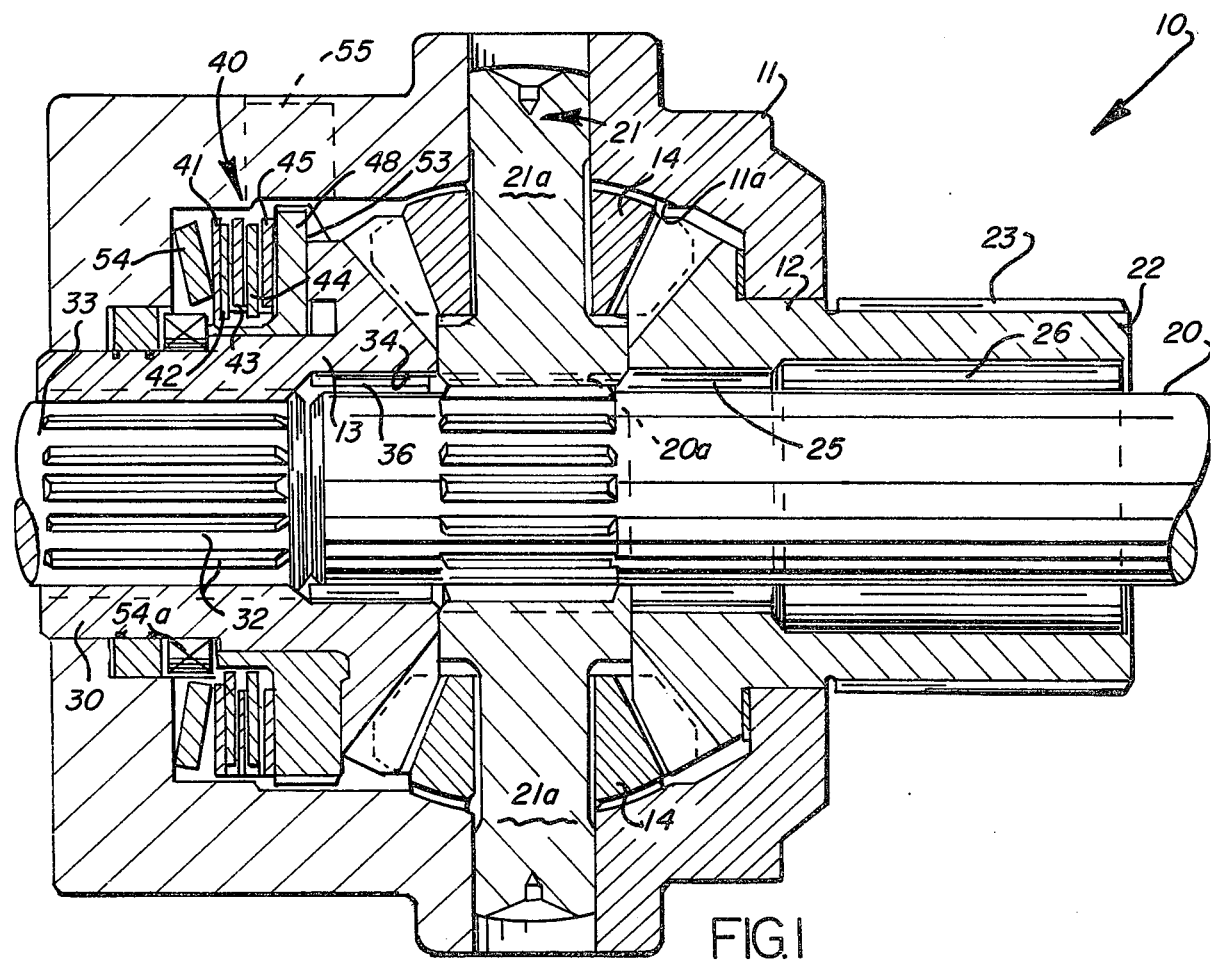
FIG. 1 is a sectional view of a differential embodying the present invention.

The present invention provides an improved differential mechanism and particularly an improved locking differential mechanism. As noted hereinabove, locking differentials are used between the wheels of a vehicle and which function, when one wheel of the vehicle slips, to transmit the torque to the nonslipping wheel of the vehicle. Such differentials are also usable interaxle in four-wheel drive vehicles. In an interaxle arrangement, the differential operates, in the event that a wheel of one axle is slipping, to transmit the torque to the non-slipping wheels on the other axle. Also, such interaxle differential mechanisms may be manually actuated in order to transmit torque to all of the wheels of the vehicle for purposes of driving all four wheels of the vehicle. The present invention is applicable to all of the above-noted types of differential mechanisms; however, the specific preferred embodiment of the present invention is disclosed as an interaxle differential in a four-wheel drive vehicle, which differential is generally designated 10 in FIG. 1.

The differential mechanism 10 includes a differential case or housing 11 which defines a differential gear chamber 11a. Located in the differential gear chamber 11a are a pair of side gears 12, 13 and pinions 14. The pinions 14 mesh with the side gears 12, 13.

The input drive to the differential mechanism 10 is through a shaft 20. The shaft 20 projects into the case 11 and on its inner end has a spline connection 20a with a spider member 21 which has radially projecting shaft portions 21a on which the pinions 14 respectively are mounted for rotation. The outer ends of the shaft portions 21a are fixed in openings in the case 11. On rotation of the shaft 20, the shaft rotates the spider member 21 which in turn effects rotation of the case 11 about the axis of rotation of the shaft 20. Also, the pinions 14 rotate about the axis of the shaft 20 and transmit drive forces to the side gears 12, 13 due to their meshing engagement therewith.

The side gear 12 has a hub portion 22 which is splined at 23. The splined portion 23 is provided for connection to a suitable drive member, such as a gear or sprocket, which in turn is drivingly connected in a suitable manner to an output drive to the front wheels of the vehicle. The side gear 12 has a central opening therethrough and is supported by the shaft 20 which extends through the opening in the side gear and into the case 11. Suitable bearings, designated 25, 26, encircle the shaft 20 and support the side gear 12 thereon for rotation relative thereto.

The side gear 13 also has a hub portion, designated 30 in FIG. 1. The hub portion 30 of the side gear 13 is internally splined at 32 and is drivingly connected with a splined shaft 33. The shaft 33 is an output drive from the differential and extends to the rear wheels of the vehicle and constitutes the input drive shaft for the rear wheels of the vehicle. The side gear 13 also has at its forward end a counterbored opening 34. The drive shaft 20 extends into the counterbored opening 34 in the side gear 13 and a suitable bearing 36 is interposed between the counterbored opening 34 of the side gear 13 and the shaft 20 to provide for relative rotation between the side gear 13 and the shaft 20, From the above it should be apparent that upon engagement of the transmission of the vehicle, the drive shaft 20 drives pinions 14 therewith as well as the case 11, and the pinions 14, due to their meshing engagement with the side gears 12, 13, transmit the drive to the side gears 12, 13, which in turn effect driving of the front and rear wheels, respectively, of the vehicle. It should also be realized that in the event the output drives to the front and rear wheels from the differential encounter different loads, the differential will differentiate in order to permit differential driving of the front and rear wheels of the vehicle.

As noted above, the differential 10, which embodies the present invention, is a locking-type differential which functions to transmit the torque to one of the side gears 12, 13 when the other of the side gears begins spinning at too high a rate. To this end, the differential 10 includes a locking mechanism for effecting a locking of the side gear 13 to the differential case 11. The locking mechanism is generally designated 40, as shown in FIG. 1, and may take a variety of different forms.

In the embodiment illustrated, the locking mechanism 40 comprises a disc clutch pack. The disc clutch pack includes a plurality of discs designated 41, 42, 43, 44 and 45. The discs 41, 43 and 45 are keyed to the case 11 for rotation therewith, while the discs 42 and 44 are keyed to a hub portion of a cam member 48. The cam member 48 is supported on the outer periphery of the hub portion 30 of the side gear 13 for rotation relative to the side gear 13.

The locking mechanism 40 functions to lock the case 11 to the side gear 13 so as to retard or prevent differentiating action. The disc clutch pack 40 is actuated by axial loading of the disc clutch pack in response to a predetermined level of differentiating action occurring. This axial loading is effected by the cam member 48 which moves axially relative to the side gear to load the disc clutch pack 40 when the differentiating action reaches a predetermined level. The axial movement of the cam member 48 is effected by cam teeth on the cam member 48 which are formed on the side thereof, generally designated 53, and which cooperate with cam teeth on the side gear 13. These cam teeth are shown in an enlarged fragmentary view in FIG. 2.

Figure 2:
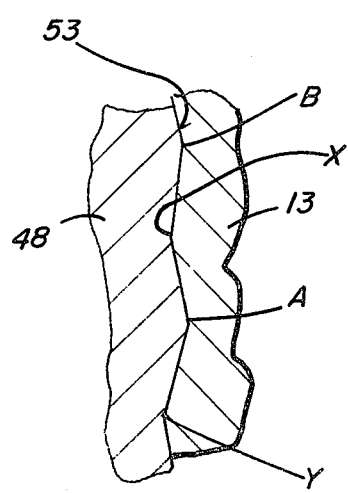
FIGS. 2–4 illustrate different operative positions of certain parts of the differential of FIG. 1.
Figure 3:
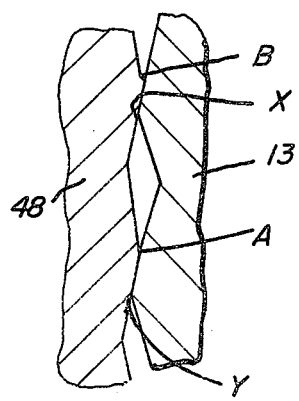

When the cam 48 and side gear 30 are in their normal position enabling differentiating action to occur, the side gear 13 and cam 48 have their cooperating cam teeth in the position of FIG. 2 where the cam teeth on the side gear 13 and cam 48 are in a full cooperating meshing engagement. In the event, however, that the cam member 48 and gear 13 rotate relative to each other, the cam teeth are shifted to a position such as shown in FIG. 3. In this position, the cam 48 is moved or cammed axially of the side gear 13 by the cooperating cam teeth. The axial movement of the cam 48 causes an axial loading of the disc clutch pack thereby to effect the locking of the differential, much as described in the afore-mentioned patent and applications.

When the cam 48 moves axially of the side gear 13, it moves in opposition to a suitable spring mechanism, preferably a Belleville-type spring 54 which acts on disc 41. In addition, a light spring 54a may act directly on the cam member, biasing it to its unload position in FIG. 1. The normal movement of the cam member 48 for purposes of lockup does not effect a compression of the springs 54, 54a to a solid position. In other words, additional travel of the cam member 48 in a direction toward the left, as viewed in FIG. 1, is possible after lockup of the differential occurs.

Many mechanisms may be provided for effecting relative rotation of the side gear 13 and cam 48 to enable the axial movement of the cam 48 to occur. The present drawings merely illustrate an actuator mechanism in block form and which is generally designated 55. The actuator mechanism 55 may take a variety of forms, but is preferably designed to retard rotation of the cam 48 when the differentiating action reaches a predetermined level. When the amount of differentiating action is below the predetermined level, the cam 48 and gear 13 are rotated together. However, when the actuator 55 is operated upon differentiating action reaching a predetermined level, rotation of the cam member 48 is retarded thereby, and thus, due to the meshing engagement of the cam teeth of the side gear 13 and the cam teeth on the cam 48, the cam 48 is moved axially.

As noted hereinabove, the actuator mechanism 55 may take a variety of different forms and may be as shown in Goscenski Applications Ser. No. 304,617, now U.S. Pat. No. 3,811,341, and Ser. No. 320,440, now U.S. Pat. No. 3,818,781, or as shown in Ottemann U.S. Pat. No. 3,606,803. Accordingly, these disclosures are incorporated herein by reference, and, since the actuator mechanism does not form a part of the present invention, the specifics of the actuator will not be described, it being understood for purposes of the present invention that the actuator does retard rotation of the cam member 48 when a predetermined degree of differentiating action occurs.

When the lockup mechanism 40 is actuated locking up the differential, no differentiating action can occur, as is well known. It should further be clear, however, that depending upon the loads that the output drives encounter, torque loads may be applied to the differential 10 tending to force differentiating action. For example, if the vehicle is driven on a hard surface road, the drive between the front wheels and the differential, as well as the drive between the rear wheels and the differential, may, when the differential 10 is locked up, tend to windup due to differences in front to rear wheel speeds caused by tire size, differential load conditions, etc. As a result, these drives apply a torque load to the differential 10 tending to effect or cause differential action to occur. Of course, due to the fact that the differential is locked up, no differentiating action can occur, and, as noted above, in differentials where there is no provision for handling such windup forces, damage may occur.

Figure 4:
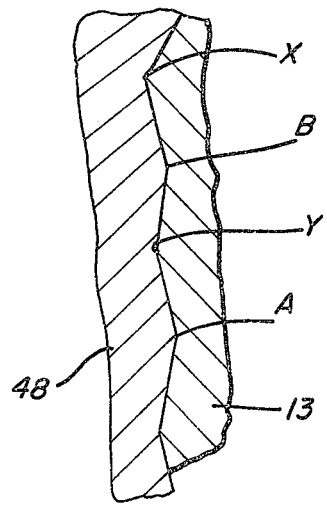

In accordance with the present invention, the differential mechanism 10 is constructed so as to enable a release of the lockup mechanism 40 when the torque load experienced by the differential due to output drive windup reaches a predetermined level. According to the present invention, when the forces applied to the differential due to windup of the output drives reaches a predetermined torque level, the teeth on the side gear 13 cause the cam 48 to shift farther axially to the left, as shown in FIG. 1, against the spring 54, and, in effect, causes the peak of the teeth on the cam member 48 to pass over the top of the peak of the teeth on the side gear 13. When this occurs, the Belleville spring 54 will immediately force the cam member 48 axially to the right and release the lockup clutch 40, thereby restoring the cam member 48 to a position as shown in FIG. 4.

As shown in FIG. 2, during normal differentiating action, the peaks A and B of adjacent cam teeth on cam 48 are in mesh with teeth on the side gear 13 and are located on opposite sides of a peak X on a cam tooth on the side gear 13. Upon lockup, the positions of these peaks are as shown in FIG. 3, the cam member having been moved axially to the left, as viewed in FIG. 1, to lock up the differential. When the windup forces cause a release of the lockup mechanism, the peak X passes over the peak A or B of the cam 48, depending upon the direction of action of the forces, thereby causing release of the lockup mechanism. The peaks of the teeth are in the positions illustrated in FIG. 4 when such release action has occurred, where the peaks X and Y on the side gear 13 have passed over the peaks B, A, respectively, on the cam member 48. FIG. 4, of course, assumes one direction of relative rotation of the cam 48 and side gear 13. The effect is the same on the opposite direction of relative rotation therebetween.

It should be apparent from the above that when the torque level applied to the differential by the tendency of the drive output to windup reaches a predetermined torque level, the lockup mechanism 40 is released, thereby avoiding any damaging torque levels in the drive line due to such windup.

Having described my invention, I claim:

1. Apparatus comprising a pair of output drives, a differential interposed between said output drives and enabling differential rotation to occur between said output drives upon different loads being applied thereto, said differential comprising differential gearing drivingly connected with said output drives and including gears which are relatively rotatable to provide said differential rotation of said outputs, and means responsive to a predetermined degree of differentiating action of said differential gearing to lock up said differential gearing and releasable upon a predetermined torque being applied to said differential gearing due to windup of said output drives when said differential gearing is locked up.

2. Apparatus as defined in claim 1 wherein said differential includes a gear case, said differential gearing comprises a pair of side gears and pinion gears meshing therewith and said lockup means comprises a disc pack cooperable to effect lockup of one of said side gears to the differential gear case.

3. Apparatus as defined in claim 2 further including a cam member interposed between the disc pack and the side gear and which is axially movable relative to the side gear to effect loading of the disc pack upon relative rotation between said side gear and said cam member, and further including an actuator means for effecting relative rotation between said cam member and said side gear.

4. Apparatus as defined in claim 3 wherein said disc pack and said cam member are biased forwardly toward the side gear by a suitable spring means against which the cam member is moved to effect loading of the disc pack.

5. Apparatus as defined in claim 4 wherein said cam member and said side gear have inclined teeth on the facing and engaging sides thereof and upon relative rotation therebetween the teeth effect a camming action for camming the cam member rearwardly relative to the side gear, and wherein said spring means enables further camming action to occur due to the torque applied to the differential by said outputs to cause the peaks of the teeth on the side gear and cam member to pass over each other to thereby provide for a release of the lockup upon said predetermined torque being experienced.

6. Apparatus comprising,
a differential case defining a differential gear chamber, differential gearing in said gear chamber including a pair of side gears and pinion gears meshing with said side gears and rotatable with said case, said side gears comprising output gears and a pair of output drives connected with said side gears for driving respective loads, a lockup clutch associated with one of said side gears for retarding rotation of said one side gear relative to said case, an actuator for actuating said lockup clutch in response to a predetermined degree of relative rotation between said side gear and said case, and said differential including a construction for deactuating said lockup clutch upon a predetermined torque being applied to said differential gearing through said output drives whereby release of lockup is achieved before damage to the differential occurs due to windup of said outputs.

* * * * *